June 3, 1969 JAMES E. WEBB 3,447,233

ADMINISTRATOR OF THE NATIONAL AERONAUTICS AND SPACE ADMINISTRATION

BONDING THERMOELECTRIC ELEMENTS TO NONMAGNETIC REFRACTORY METAL ELECTRODES

Filed Sept. 30, 1966

INVENTORS

Martin Weinstein &

Eldon J. Sherwin

BY

ATTORNEYS

United States Patent Office 3,447,233

Patented June 3, 1969

3,447,233

BONDING THERMOELECTRIC ELEMENTS TO NONMAGNETIC REFRACTORY METAL ELECTRODES

James E. Webb, Administrator of the National Aeronautics and Space Administration, with respect to an invention of Martin Weinstein, Wayland, and Eldon J. Sherwin, Ashland, Mass.

Filed Sept. 30, 1966, Ser. No. 584,072
Int. Cl. B23k *31/02;* H01l *15/00;* H01v *1/30*
U.S. Cl. 29—472.9 2 Claims The invention described herein was made in the performance of work under a NASA contract and is subject to the provisions of Section 305 of the National Aeronautics and Space Act of 1958, Public Law 85–568 (72 Stat. 435; 42 U.S.C. 2457).

Figure 1:
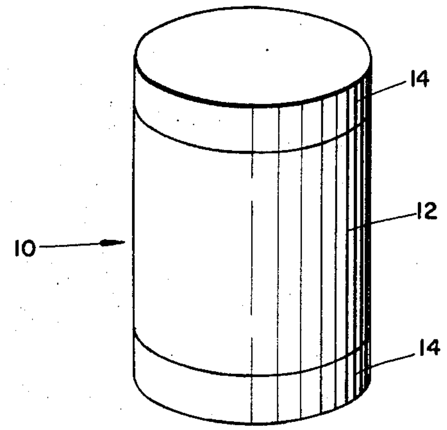

The present invention relates to thermoelectric generators and more particularly to a method of bonding thermoelectric elements to nonmagnetic electrodes.

Thermoelectric generators offer substantial advantages over the more conventional electrical power sources. These generators contain no moving parts and are essentially free from maintenance and noise in operation. They are capable of operating at very high temperatures and over a wide range of input conditions. Additionally, aside from heat they require no external support as contrasted with, for example, a rotary generator which requires some form of motor and fuel. Also, the efficiency of a thermoelectric generator is not dependent upon size, but is determined solely by the Carnot cycle and the generator's inherent index of efficiency.

One major problem which has hindered the application of thermoelectrics in the field of power generation is that of making satisfactory electrical and thermal contact to the thermoelement of the generator. A number of different approaches have been taken to provide low resistance, stable contacts to thermoelements under varying environment conditions. These can be divided generally into methods which maintain contact mechanically, as by spring loading, and those which employ an integral electrode, usually metallurgically bonded. The former add considerable size and complexity to the module system; while the latter although more efficient are most severely troubled by problems of material incompatibility.

Among the important requirements for a suitable thermoelement electrode are that it will not react with the material of the element to form, for example, low melting compounds; that the electrode material not be electrically active if it diffuses into the element; that the coefficient of expansion of the electrode material approximate that of the thermoelectric element; and that it will initially form a strong, low-resistance bond to the element.

Iron electrodes have been successfully bonded to thermoelectric elements but exhibit several disadvantages which makes their use undesirable. It has been found that after a period of time the soft iron diffuses into the body of the element degrading the electrical properties of the unit. Also, iron, as a magnetic material, is not suitable for use in spacecraft where thermoelectric generators are especially desirable due to their simplicity and long lifetime.

Tungsten, as a refractory, nonmagnetic material exhibiting good electrical properties, would be well-suited for use as an electrode material in thermoelectric generators; however, prior to this invention it has not been thought possible to successfully bond tungsten to an element such as lead-telluride due to the difference in thermal expansion co-efficients of the two materials.

It is accordingly an object of the present invention to provide a method for obtaining a stable bond between a thermoelectric element and an electrode.

It is a further object of this invention to provide a method for obtaining a metallic bond between a thermoelectric element and an electrode, which bond does not affect the semiconductor properties of the thermoelectric element.

It is an additional object of this invention to provide a method for bonding lead telluride thermoelectric elements to tungsten electrodes.

It is another object of the invention to provide a lead telluride thermoelectric element having nonmagnetic, refractory metal electrodes bonded thereto.

Other objects and features of the invention will become apparent to those skilled in the art as the disclosure is made in the following description of a preferred embodiment of the invention.

In accordance with the invention and attainment of the foregoing objects the present process includes the steps of thoroughly washing and degreasing the thermoelectric elements and electrodes to which they are to be bonded, lapping both the elements and the electrodes to achieve a flat bond interface, re-cleaning, and then diffusion bonding the assembled elements in an inert-gas atmosphere for a preselected period of time.

Figure 2:
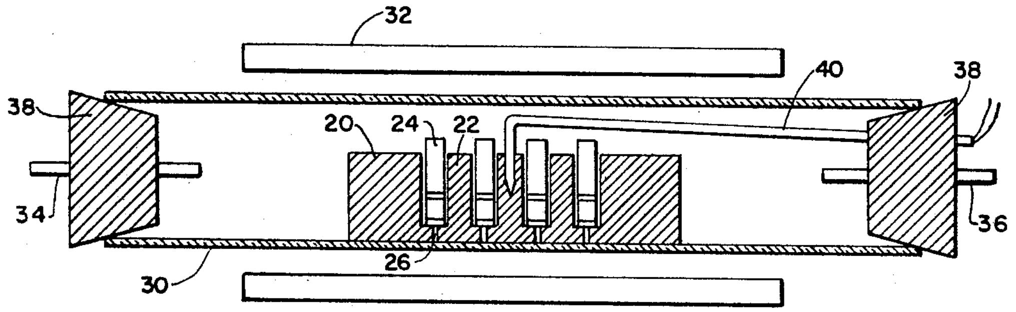

FIGURE 1 is a perspective view of a thermoelectric device assembled according to the teachings of the invention; and FIGURE 2 is a schematic view partly in cross-section of the diffusion bonding apparatus of the present invention.

The thermoelectric device as produced by the method of this invention is depicted at 10 in FIGURE 1. Element 12 is lead telluride or an alloy thereof such as lead-tin telluride. Lead telluride and its alloys are used in the majority of thermoelectric generators in operation at this time. Such elements in their common form are fabricated by cold-pressing and sintering. Electrodes 14 are of tungsten which is desirable as it is nonmagnetic, has low electrical resistivity and will not react with the lead telluride base element.

To achieve a strong bond the contacting surfaces of the elements to be joined must form a flat interface free of impurities. Thus, the elements are lapped on a flat glass plate in a series of operations. This has been found preferable to conventional grinding and polishing procedures which result in slightly convex surfaces and poor bonds after diffusion. Silicon carbide lapping material may be employed during the initial lapping operations and a final lap of fine grit aluminum oxide provides the desired flat smoother surfaces. All elements are then thoroughly degreased, washed ultrasonically in a solution of an alcohol cleanser and de-ionized water, and then rinsed first in de-ionized water and then in boiling methanol. The cleaned elements are retained in the methanol solution until they are to be loaded into the bonding fixture.

The polished and cleaned elements are then warm air dried and loaded into bores 22 in a graphite boat 20 as shown in FIGURE 2. Tungsten weights 24 are then inserted in the bores to maintain pressure and alignment of the elements during bonding. Reduced bores 26 communicate with the bores 22 and function to relieve pressure which might arise during the bonding process.

The loaded graphite boat 20 is then inserted into a quartz or high silicon glass tube 30 which in turn is placed in the hot zone of a resistance heater 32. The atmosphere within the furnace is then purged through inlet 34 and outlet 36 located within resilient stoppers 38. A highly purified inert gas such as argon or helium is used to remove impurities which could adversely affect bond strength. The furnace is then, through the use of the resistance heater 32, brought to a temperature within the range of 840–850° C. for a period of 20 minutes. This time-temperature cycle has been found sufficient to eliminate interface porosity and establish a strong stable bond. During the heating the system is continuously purged by the flow of high purity gas and the temperature is monitored through the thermocouple probe 40.

The exact nature of the bond formed is not known at this time. It has been hypothesized that the tungsten metal diffuses into the lead telluride or that an alloy is formed during the bonding but neither theory has been proven.

EXAMPLE

To achieve a flat contact interface the tungsten electrodes and PbTe elements were mounted on parallel lapping fixtures and then polished in the following sequence:

180 grit SiC
240 grit SiC
320 grit SiC
400 grit SiC
600 grit SiC
1800 grit SiC

Both the elements and the electrodes were then twice degreased in boiling propanol (mounting wax solvent), ultrasonically cleaned in a solution of alconox in deionized $H_2O$ for approximately 15 minutes, rinsed in deionized $H_2O$, and rinsed again in boiling methanol. The components were submerged in methanol until immediately prior to use.

Upon removal from the methanol storage solution the components were warm air dried and loaded into a graphite boat (as shown in FIGURE 2). The boat was inserted into the hot zone of a resistance furnace and the system purged with high purity argon gas. The furnace was then brought to a temperature of from 840 to 850° C., and this temperature range held for 20 minutes. The system was thereafter cooled in argon flow.

Utilizing the method of this invention bond strengths in excess of 2500 p.s.i. have been obtained. The thermoelectric elements thus formed can be designed for systems which require long term stability over a wide range of environmental condiitons. The method has also been successfully employed to bond tungsten electrodes to alloys of lead telluride such as lead-tin telluride (PbTe-SnTe).

Electron microprobe analysis and lead telluride equilibria studies have shown tungsten and lead telluride to be chemically compatible at operative temperature of 600° C. Contact resistivities in a range of 5 to 25 micro-ohms cm.$^2$ have been consistently obtained and no degradation has been observed during operation. These resistivities compare quite favorably to those found in iron electrodes which initially exhibit resistivities on the order of 100 micro-ohms cm.$^2$, and this valve increases during operation as a result of diffusion of the iron electrode into the body of the element.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A method of bonding a tungsten electrode to a thermoelectric element selected from the group consisting of lead-telluride and lead-tin-telluride, comprising the steps of:

cleaning the thermoelectric element and the electrode,
lapping a surface of the thermoelectric element and the electrode to form a flat face on each,
assembling the element and the electrode so that the lapped surfaces are in close contact, and
heating the assembly to a temperature of from 840 to 850° C. for a period of time sufficient to bond the electrode material onto the thermoelectric element and thereby form a strong stable bond therebetween.

2. The method of claim 1 wherein:

said heating is carried out in a protective atmosphere of a gas selected from the group consisting of helium and argon, and
said heating is for a period of approximately 20 minutes.

References Cited

UNITED STATES PATENTS

| | | | |
|---|---|---|---|
| 3,000,092 | 9/1961 | Scuro | 29—472.9 X |
| 3,030,704 | 4/1962 | Hall | 29—472.9 |
| 3,139,680 | 7/1964 | Scuro | 29—472.9 |
| 3,216,088 | 11/1965 | Fraser | 29—472.9 X |
| 3,235,957 | 2/1966 | Horsting | 29—573 X |
| 3,298,095 | 1/1967 | Hicks | 29—573 X |
| 3,306,784 | 2/1967 | Roes | 29—573 X |
| 3,342,587 | 9/1967 | Dingwall | 29—472.9 X |

JOHN F. CAMPBELL, *Primary Examiner.*

R. F. DROPKIN, *Assistant Examiner.*

U.S. Cl. X.R.

29—195, 494, 498, 504, 573, 590; 136—205; 287—189, 365